Jan. 30, 1951         D. F. SWANSON         2,539,708

DEMOUNTABLE LEECHER BUCKET FOR COFFEE URNS

Filed June 14, 1946         2 Sheets-Sheet 1

Inventor.
Donald F. Swanson,
by John F. Brezina
Attorney.

Jan. 30, 1951 D. F. SWANSON 2,539,708
DEMOUNTABLE LEECHER BUCKET FOR COFFEE URNS
Filed June 14, 1946 2 Sheets-Sheet 2
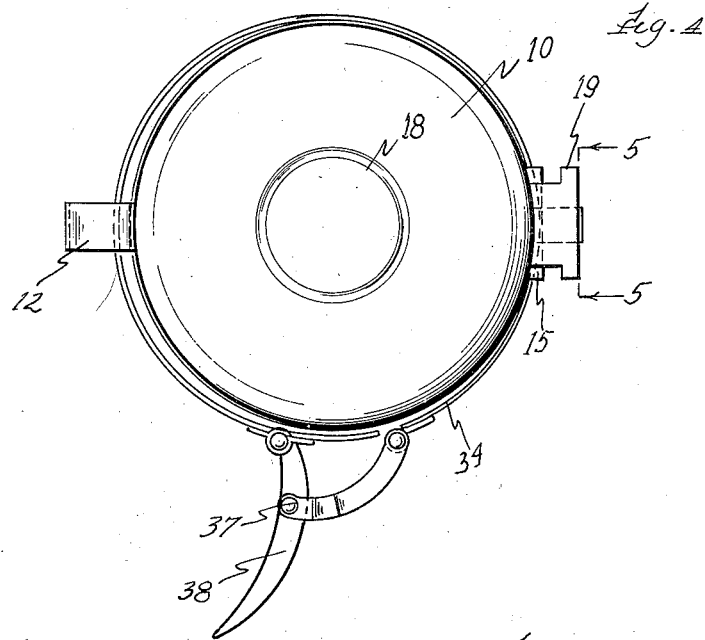
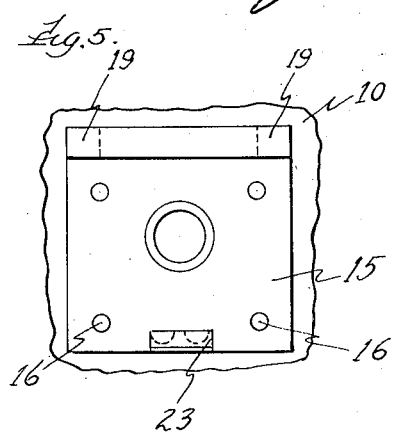
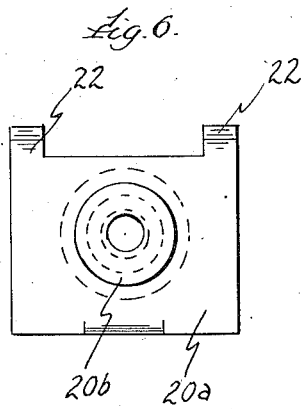
Inventor.
Donald F. Swanson
by John F. Brezina
Attorney.

Patented Jan. 30, 1951

2,539,708

UNITED STATES PATENT OFFICE 2,539,708

DEMOUNTABLE LEECHER BUCKET FOR COFFEE URNS

Donald F. Swanson, Chicago, Ill.

Application June 14, 1946, Serial No. 676,681

3 Claims. (Cl. 99—317)

This application is a continuation in part of applicant's prior application Serial No. 561,782; now Patent No. 2,493,932.

This invention is directed to a novel leecher bucket or hood and a novel sprayhead construction for coffee urns.

It is an important object of my invention to provide easily mountable and dismountable leecher buckets for coffee urns and means associated therewith for easily mounting and dismounting the leecher bucket, cover or hood from the stationary and fixed parts of the urn.

It has been the present practice in the use of restaurant type coffee urns to utilize a removable fabric bag whose periphery is stitched about a metal ring and wherein such bag is merely placed into the upper part of the urn below the hood and sprayhead and normally supported upon one or another form of inwardly extending elements. The ground coffee is normally dumped into such bag and the hot water expelled from the sprayhead falls through the ground coffee and into the inner coffee containing tank. Such standard coffee bags or sieves are difficult to clean and have unsanitary characteristics in use as well as the disadvantage that they hold the body of ground coffee in a relatively restricted area and mass in substantial central portion of the bag, with the result that some of the hot water emanating from the sprayhead by-passes such ground coffee in its descent into the coffee containing tank.

Another objectionable feature of presently known urns is that the hoods themselves do not contain or mount the sprayhead in most desired positions, and as the nozzle, head and pipe leading thereto are of metal it has been impossible to satisfactorily mount such sprayhead into the leecher buckets themselves inasmuch as the conventional hoods and buckets have to be opened or removed to place the coffee grounds thereinto and for other purposes.

It is an object of my invention to provide a combined hood or leecher bucket and sprayhead and means for mounting both thereof with respect to the stationary hot water feed lines of the coffee urn which will permit quick and easy mounting and remounting thereof to effect a sealed enclosed path for the hot water and to join the inner sprayhead or pipe with the hot water feed line, and to provide a removable fabric or metal sieve mounted directly upon the normally lower portion of the leecher bucket, together with easily operable clamping means for securing the sieve to the lower portion of the metal leecher bucket.

A further object and accomplishment of my invention is to provide the means of a leecher bucket and having an easily separable and securable connection with the hot water feed line and or the swivel member thereof and which device is removable with one hand when it is desired to either replace coffee grounds or clean the interior parts of the urn or leecher bucket.

My novel construction accomplishes the novel result of evenly spraying the hot water over the coffee grounds and thoroughly extracting the desirable qualities and it also eliminates the usual repouring of partial brew over and through the grounds and which eliminates any possibility that the brewed coffee will come into contact with the ground coffee which re-contact is an objectionable feature.

Other and further objects of the invention will be apparent from the following description, appended claims and accompanying drawings.

On the drawings:

Fig. 4 is a bottom plan view of my device.

Fig. 5 is an elevation of an enlarged fragment of the mounting plate taken on line 5—5 of Fig. 4.

Fig. 6 is an enlarged elevation of the connection fitting.

Figure 1:
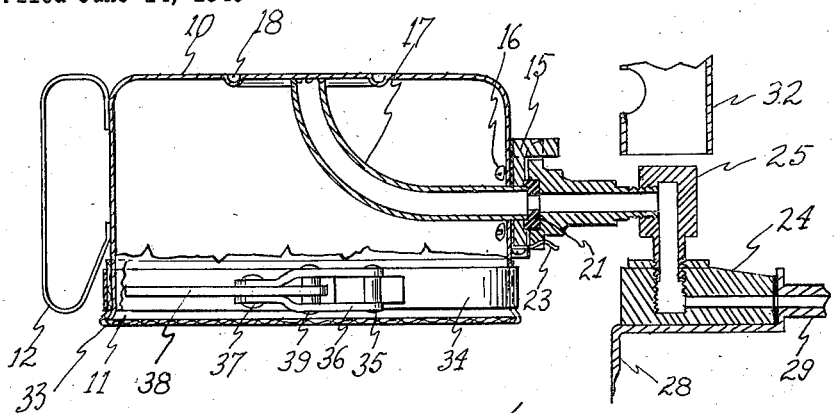
Fig. 1 is a partially cross sectional view and partially elevational view of my novel leecher bucket construction.
Figure 2:
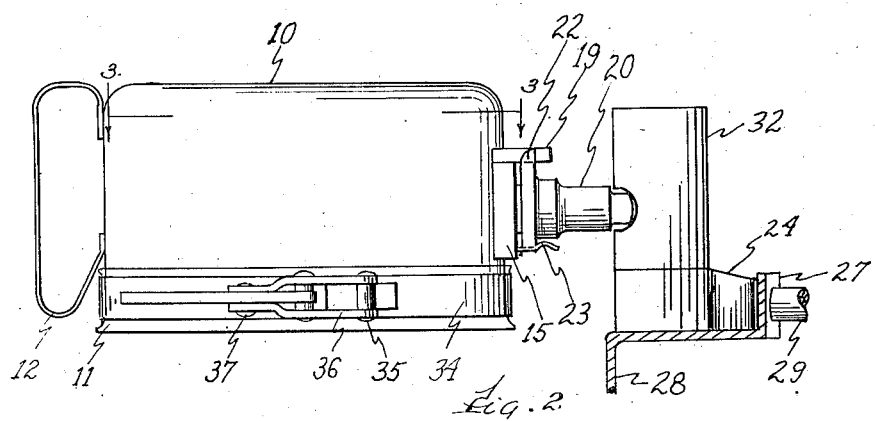
Fig. 2 is a side elevational view thereof, with parts broken away at the right hand side thereof.

Referring to Figs. 1 and 2, numeral 10 designates a metal cover or hood or leecher bucket whose annular edge is bent outwardly to form a flange 11 which is adapted to overly the upper peripheral edge of a coffee urn. A metal bail or handle 12 is secured by welding or the like in normally vertical position on the outer surface of the hood 10.

Hood 10 has a hole 13 in its side, preferably diametrically, opposite handle 12 upon which a passaged mounting block 15 is secured by rivets or screws 16 which pass through suitable holes from the inside of the hood 10. The central hole of the block 15 is threaded and has mounted thereon one threaded end of curved delivery pipe 17 whose upper end terminates adjacent though short of the central part of the upper wall of hood 10, the said end being preferably recessed to provide outlets for hot water. Hood 10 is preferably provided with an annular flange 18 surrounding the upper end of pipe 17.

Figure 3:
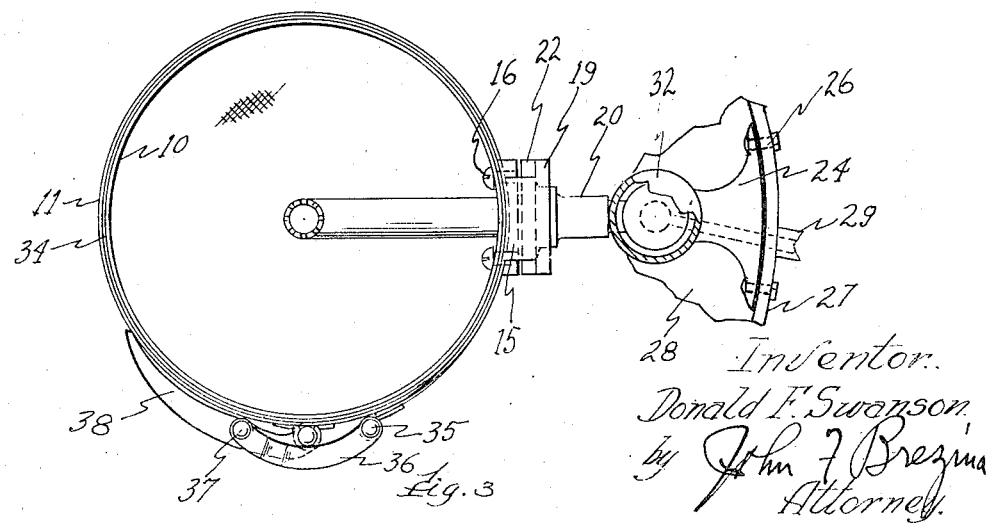
Fig. 3 is a cross sectional view taken on a transverse plane and taken on lines 3—3 of Fig. 2.

The transversely extending flange of mounting block 15 has a pair of integral oppositely extending lugs or extensions 19, as shown in Fig. 3, which are separated from the main portion of said block 15 by recesses. Numeral 20 designates a passaged fitting similar to a nozzle which has a flat face member or plate 20—a with an annular central recess 20—b to seat a gasket 21 therein, which gasket partially projects outward as indicated. Said fitting 20 has a pair of integral upwardly extending spaced apart teeth or lugs 22 which are adapted to be inserted and removably mounted in the recesses behind lugs 19.

The lower flanged edge portion of fitting 20 is adapted to snap behind the bent portion of metal projecting spring or clip 23 which has one end suitably secured on mounting block 15 as shown in Figs. 1 and 2.

The opposite reduced end of fitting 20 is threaded in a threaded hole in a passaged plug or fitting 25, whose lower threaded portion is threaded into an upwardly opening passage of a metal bracket 24 whose extended arcuate base portion is secured by bolts 26 to the upwardly extending annular flange 27 of the inner coffee receptacle or liner 28, only a fragment of which is shown in Figs. 2 and 3. Rotation of fitting 25 in passage bracket 24 provides swinging movement of the leecher bucket or hood while the latter is mounted, as illustrated in Figs. 1 and 2, and also permits swinging movement of the delivery pipe when the hood 10 is removed. The inlet port of passage bracket 24 is adapted to be connected to the hot water feed line partially represented by pipe section 29.

A centrally slotted metal cylindrical cap or cover 32 is removably mounted over the plug or fitting 25, the same being mounted in position before screwing in the fitting 20 into plug 25.

A sieve or bag 33, which is preferably of fabric of the desired mesh to hold ground coffee, is removably mounted upon the normally downwardly facing opening of hood or bucket 10 by means of a metal clamping ring 34, one of whose end portions has an integral hinged knuckle as indicated in the drawings, wherein is mounted rivet or pin 35. A pair of arcuate links or levers 36 have one end of each thereof pivoted by pin 35, and the opposite ends of said links 36 are pivoted by pin 37 to the intermediate portion of hand lever 38.

Lever 38 is pivoted at one end by pin 39 to the knuckles on one end of clamping ring 34, and said respective pins 37, 39 and 35 are so located that when the lever 38 is pressed to closed position, it will snap past dead center and the tendency of ring to expand will hold said lever 38 in closed position, until manual opening movement.

This means of removably mounting the sieve or bag 33 permits easy mounting thereof upon the leecher bucket when it is moved and inverted and resting upon a table or counter, and permits easy replacement thereof whenever desired.

An important advantage is that the leecher bucket or hood is entirely removable from the urn, such removing movement being by lifting up the handle end of the bucket to snap out the flange of the fitting 20 from engagement with the spring 23 and lifting the bucket upward to disengage the lugs 22 and 19, whereupon the bucket may be emptied or placed upon a horizontal surface in inverted position and the coffee grounds may be dumped into the inverted bucket, the sieve placed thereover and secured by the clamping ring 34 in the described manner. The clamping on of the fabric sieve also pulls the edge areas of the sieve around the flange 11 of the hood 10 to thereby tighten said sieve and hold it in a more even plane to prevent the coffee grounds from being bunched up at the center of the sieve.

This construction provides a more sanitary means of holding the coffee grounds which are held spread out over a wide area on the sieve.

My construction also eliminates the relatively larger cost of conventional coffee bags as well as the frequently required cleaning and replacement thereof, as the fabric sieves usable with my construction may be flat panels or disks of fabric of the desired mesh stamped from a bolt of fabric at low cost.

As the hot water delivered through the feed pipe 29 and through delivery pipe 17 is under pressure, it will, when leaving said pipe 17, spread laterally and be deflected downwardly over a wide area by the flange 18, to then drop through the coffee grounds.

The yieldable sealing gasket 21 forms a tight, though removable, seal when the leecher bucket is mounted in position as shown in Figs. 1 and 2, and the previously described removability permits easy cleaning of the feed pipes and delivery pipe 17 and fitting 20.

I am aware that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof.

I claim:

1. In a device for swivelly and removably mounting a freely swingable cover or the like with respect to an open ended receptable so that said cover is operative in various swiveled positions; a horizontally extending passaged bracket having a threaded opening; an upwardly extending passaged fitting having its lower end rotatively mounted in the opening of said bracket, said fitting having a side opening; a horizontally extending passaged fitting having an enlarged end and having a pair of spaced apart upwardly extending teeth, a mounting block having transversely extending extensions thereon, said extensions being normally engaged by said teeth; and a spring tension clip connected to an end portion of said mounting plate adapted to normally engage the edge portion of said last mentioned fitting to thereby removably mount said mounting block, said mounting block being adapted to have a cover or the like secured thereto.

2. In a swivelly mounted leecher bucket for urns and the like and having a plurality of operable positions, a receptacle having a side opening; a mounting block having a passage therein mounted on said receptacle and having a plurality of outwardly extending lugs thereon, said block carrying a spring tension clip; a horizontally extending fitting having a passage therein and having extensions thereon whereby said last mentioned fitting is connected to said block, said receptacle being releasably retained by the co-action of said clip and said last mentioned fitting when said extensions are engaging said lugs; an upwardly extending fitting having a passage therein connected to said horizontally extending fitting and having a side opening; a bracket having a passage therein on which said upwardly extending fitting is swivelly mounted and being mountable on a water feed line whereby said receptacle may be selectively swung over each of a plurality of tanks in an urn.

3. In a device substantially as recited in claim 2 and having an upwardly curved pipe extending through said receptacle opening; a gasket seated in an end of said first mentioned fitting at the end of said last mentioned pipe, and wherein said receptacle has a handle and can be removed from said first mentioned fitting by pulling upwardly on said handle; and a downwardly extending flange integral with said receptacle whereby water discharged from said pipe will be deflected downwardly over a large area.

DONALD F. SWANSON.

REFERENCES CITED

The following references are of record in the file of this patent:

UNITED STATES PATENTS

| Number | Name | Date |
|---|---|---|
| 222,109 | West | Nov. 25, 1879 |
| 411,037 | Jones | Sept. 17, 1889 |
| 437,890 | Gilbert | Oct. 7, 1890 |
| 663,723 | Brown et al. | Dec. 11, 1900 |
| 873,980 | Barwise | Dec. 17, 1907 |
| 918,765 | Miller | Apr. 20, 1909 |
| 1,549,091 | Kelly | Aug. 11, 1925 |
| 1,561,788 | Kelly | Nov. 17, 1925 |
| 1,569,028 | Post | Jan. 12, 1926 |
| 1,574,154 | Kelly | Feb. 23, 1926 |
| 1,630,904 | Reckard | May 31, 1927 |
| 1,680,792 | Kleinlercher | Aug. 14, 1928 |
| 1,882,140 | Haines | Oct. 11, 1932 |

FOREIGN PATENTS

| Number | Country | Date |
|---|---|---|
| 258,178 | Italy | Apr. 7, 1928 |
| 766,431 | France | Apr. 16, 1934 |